(12) United States Patent
Camp

(10) Patent No.: US 7,450,539 B1
(45) Date of Patent: Nov. 11, 2008

(54) POWER REGULATION FOR A MULTI-CARRIER COMMUNICATION SYSTEM

(75) Inventor: James C. Camp, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 1061 days.

(21) Appl. No.: 10/777,351

(22) Filed: Feb. 11, 2004

Related U.S. Application Data

(60) Provisional application No. 60/446,961, filed on Feb. 11, 2003.

(51) Int. Cl.
*H04Q 7/00* (2006.01)

(52) U.S. Cl. ........................... 370/328; 455/522
(58) Field of Classification Search .......... None
See application file for complete search history.

(56) References Cited

U.S. PATENT DOCUMENTS

| | | | |
|---|---|---|---|
| 3,898,566 A | 8/1975 | Switzer et al. | |
| 5,228,055 A | 7/1993 | Uchida et al. | |
| 5,287,387 A | 2/1994 | Birchler | |
| 5,299,230 A | 3/1994 | Jaeger et al. | |
| 5,490,172 A | 2/1996 | Komara | |
| 5,621,762 A | 4/1997 | Miller et al. | |
| 5,636,247 A | 6/1997 | Kamerman et al. | |
| 5,644,773 A | 7/1997 | DiMarco | |
| 5,651,028 A | 7/1997 | Harris et al. | |
| 5,727,026 A | 3/1998 | Beukema | |
| 5,822,360 A | 10/1998 | Lee et al. | |
| 5,991,285 A * | 11/1999 | Ghosh ........................ | 370/335 |
| 6,009,090 A | 12/1999 | Oishi et al. | |
| 6,032,029 A | 2/2000 | Futagi et al. | |
| 6,128,351 A | 10/2000 | Jones et al. | |
| 6,130,918 A | 10/2000 | Humphrey et al. | |
| 6,175,551 B1 | 1/2001 | Awater et al. | |
| 6,236,864 B1 | 5/2001 | McGowan et al. | |
| 6,294,956 B1 | 9/2001 | Ghanadan et al. | |
| 6,449,302 B2 | 9/2002 | Hunton | |
| 6,449,303 B2 | 9/2002 | Hunton | |
| 6,504,862 B1 | 1/2003 | Yang | |
| 6,594,501 B2 * | 7/2003 | Black et al. .................. | 455/522 |
| 6,654,358 B1 * | 11/2003 | Park et al. .................... | 370/318 |
| 6,748,234 B1 * | 6/2004 | Agrawal et al. ............. | 455/522 |
| 6,909,704 B2 * | 6/2005 | Sakoda ........................ | 370/335 |
| 2001/0019962 A1 * | 9/2001 | Goto ........................... | 455/522 |
| 2001/0046213 A1 * | 11/2001 | Sakoda ........................ | 370/328 |
| 2003/0114180 A1 * | 6/2003 | Black et al. .................. | 455/522 |

* cited by examiner

*Primary Examiner*—Bob A Phunkulh
(74) *Attorney, Agent, or Firm*—Koppel, Patrick, Heybl & Dawson

(57) ABSTRACT

A communication system includes a multi-channel signal regulation system that limits an aggregate signal in response to an indication that the aggregate signal exceeds a threshold value. The aggregate signal is formed from a combination of the input signals.

27 Claims, 5 Drawing Sheets

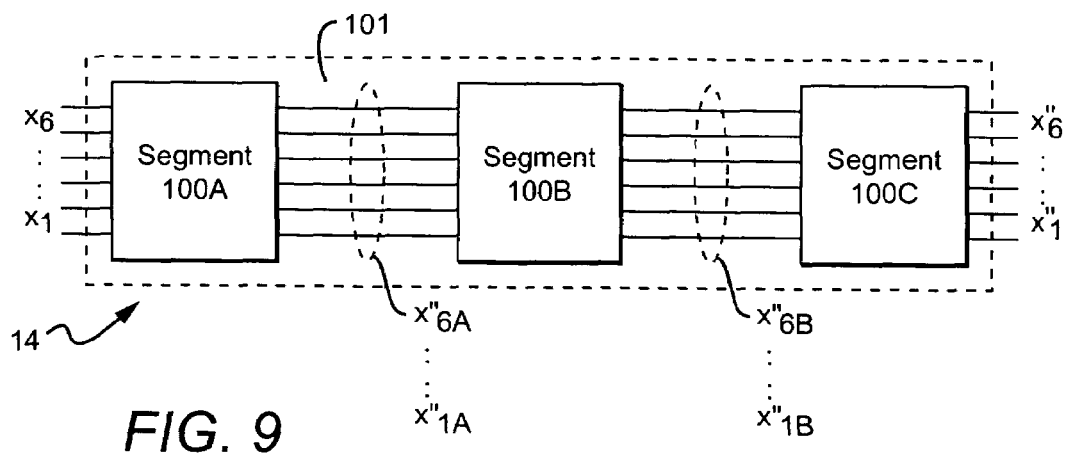
FIG. 9
FIG. 10
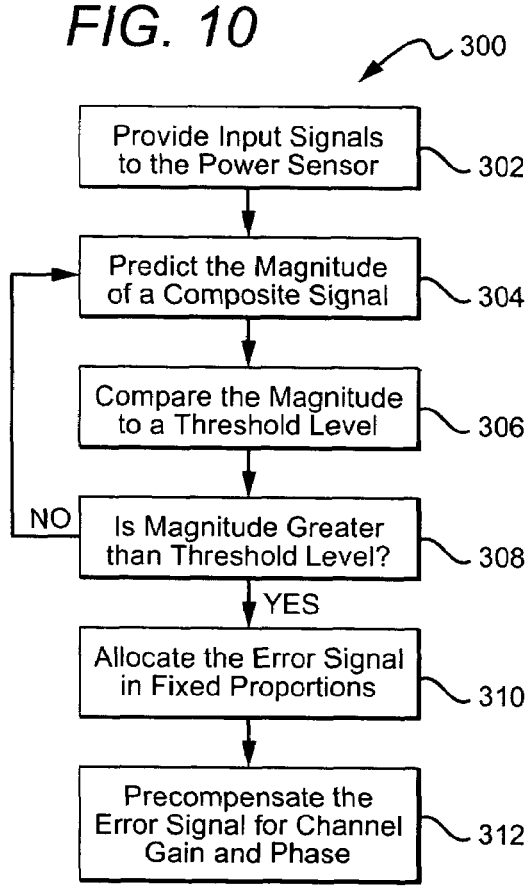
FIG. 11
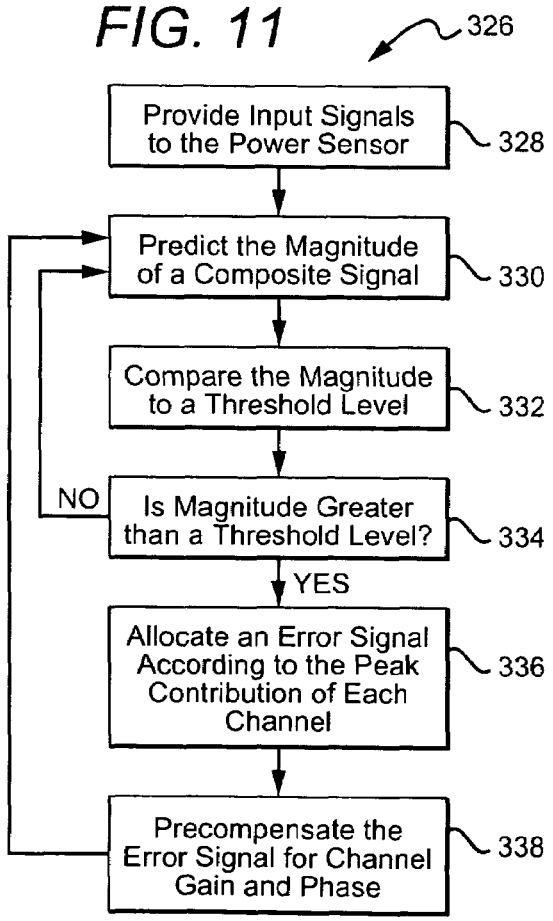

POWER REGULATION FOR A MULTI-CARRIER COMMUNICATION SYSTEM

CROSS REFERENCES TO RELATED APPLICATIONS

This application claims the benefit of U.S. Provisional U.S. Provisional Application Ser. No. 60/446,961 filed on Feb. 11, 2003.

BACKGROUND OF THE INVENTION

1. Field of the Invention

This invention relates generally to communication systems and, more particularly, to power regulation in multi-carrier communication channels.

2. Description of the Related Art

Code Division Multiple Access (CDMA) technology is often used in communication systems to transmit video, voice or computer data in a sequence of signal pulses. CDMA provides a higher capacity transfer of data when compared to other technologies, such as Time Division Multiple Access (TDMA) or Frequency Division Multiple Access (FDMA). TDMA typically transmits data from multiple users in the same frequency band at different times, while FDMA typically transmits data from multiple users in different frequency bands at the same time. Hence, in TDMA and FDMA, the data from a particular user can be detected at a unique time or frequency band, respectively.

CDMA can provide a higher data transfer rate because CDMA transmits multiple channels of information onto a given frequency band through the use of digital encoding. The digital encoding can include unique user assigned codes to distinguish the different users. Unlike TDMA, multiple CDMA codes and multiple FDMA frequencies can be active at the same time, which increases the potential magnitude of rare large amplitude peaks. The large amplitude peaks can be caused by constructive interference between signals transmitted on different frequencies. As more signals are added together, the magnitude and likelihood of large amplitude peaks from constructive interference increases. More information regarding peak power regulation in communication systems can be found in U.S. Pat. No. 6,236,864.

Multi-channel CDMA and FDMA systems typically include linear power amplifiers. However, linear power amplifiers capable of reproducing large amplitude peaks are expensive to manufacture and operate. In addition, when a linear amplifier saturates because of a large amplitude peak, it can produce broadband distortions which can persist after the large amplitude signal has passed.

Some prior art approaches increase the dynamic range of the power amplifier to better accommodate large amplitude peaks. The dynamic range typically refers to the range of signal amplitudes capable of being processed without distorting the signal or saturating the amplifier or other components included in the system. However, this is costly and increases power consumption and cooling requirements.

Other prior art approaches limit or clip the signal amplitude at various points in the transmission channel of the communication system. The limiting can be done early or late in the transmission channel or at many points along the transmission channel. Limiting, however, has many disadvantages. For example, limiting can cause broadband distortions which typically need to be filtered to meet emissions specifications. Limiting late in the transmission channel produces better signal quality, but poor spectral confinement which leads to broadband frequency distortions which must be filtered. Another disadvantage is that it is difficult to balance the limiting when clipping along the length of the channel. Further, the filters are relatively expensive and tend to partially restore the original peaks. In addition, the remaining distortions are distributed according to the frequency response of the filter. Consequently, there is a need for a communication system that can process large amplitude peaks without causing saturation or distortion.

BRIEF SUMMARY OF THE INVENTION

The present invention includes a communication system with a multi-channel signal regulation system that limits an aggregate signal in response to a prediction that the aggregate signal would otherwise exceed a threshold value. The aggregate signal is formed from a combination of the input signals.

In one embodiment, the communication system can include channel power regulators which each sense a corresponding input signal. The channel power regulators add cancellation pulses to their respective input signals in response to the prediction that the composite signal would otherwise exceed the threshold value. An output stage can be coupled to the channel power regulators through multi-carrier communication channels.

The invention includes an error signal generator with a circuit that generates an output signal with a magnitude equal to a threshold value and a phase equal to that of an input signal. The error signal generator also includes a signal combiner which generates an error signal proportional to the difference between the output and input signals.

The invention also includes a method of predicting the amplitude of a composite signal. The method involves sensing input signals and forming a composite signal from the input signals. The magnitude of the composite signal is compared to a threshold value. If the magnitude of the composite signal exceeds the threshold value, then cancellation signals are combined with the respective input signals to reduce the composite signal.

These and other features, aspects, and advantages of the present invention will become better understood with reference to the following drawings, description, and claims.

BRIEF DESCRIPTION OF THE DRAWINGS

FIG. 9 is a simplified block diagram of another composite power regulator that can be used in the system of FIG. 2; and FIGS. 10 and 11 are simplified flowcharts of static and dynamic error allocation, respectively, that can be performed with the present invention.

DETAILED DESCRIPTION OF THE INVENTION

Figure 1:
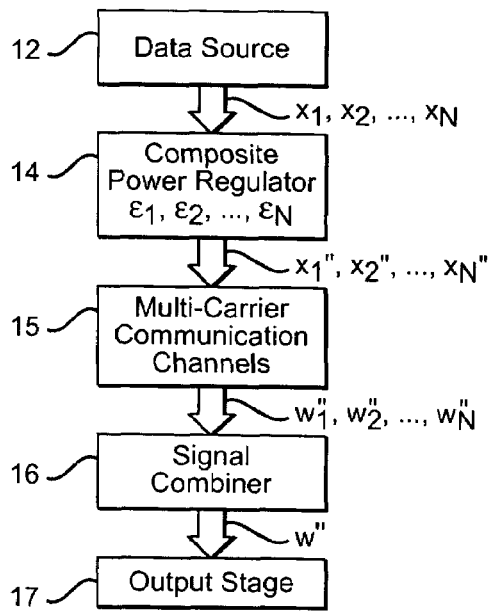
FIG. 1 is a simplified block diagram of a multi-carrier communication system in accordance with the present invention.

FIG. 1 illustrates a simplified block diagram of a multi-carrier communication system 10 in accordance with the present invention. System 10 can be used as a transmit signal processor to process data using Code Division Multiple Access (CDMA), Frequency Division Multiple Access (FDMA), or another data communication process which can be subjected to constructive interference between signals. Typical transmit signal processors include cellular/PCS basestations, micro/pico cell basestations, multi-carrier IS-95, CDMA-2000, TD-SCDMA, WCDMA basestations, broadband wireless access head end, software defined radio, OFDM systems, and other high speed signal processing applications.

In one embodiment, system 10 includes a data source 12 connected to a multi-carrier communication channel 15 through a composite power regulator 14. Data source 12 provides digital or analog input signals $x_1, x_2, \ldots, x_N$ to regulator 14, where N is the number of input signals. N does not have to be equal to the number of channels in communication channel 15. However, such an equality is illustrated for simplicity and ease of discussion, with each channel transmitting one input signal. Multi-carrier communication channel 15 is connected to an output stage 17 through a signal combiner 16. Output stage 17 generally includes a Digital-to-Analog Converter 13 and a radio amplifier 18 (See FIG. 2).

Power regulator 14 combines signals $x_1, x_2, \ldots, x_N$ with corresponding error signals $\epsilon_1, \epsilon_2, \ldots, \epsilon_N$ in some instances, to provide corresponding corrected signals $x_1'', x_2'', \ldots, x_N''$ which are outputted to channel 15. Signals $x_1'', x_2'', \ldots, x_N''$ are transmitted through channel 15 to provide signals $w_1'', w_2'', \ldots, w_N''$, respectively, where signals $w_1'', w_2'', \ldots, w_N''$ are related to signals $x_1'', x_2'', \ldots, x_N''$ by the frequency response of the corresponding channel. It should be noted here and throughout the disclosure that the signals are generally complex numbers represented by a magnitude and a phase.

Each channel in communication channel 15 typically includes a cascade of interpolating filters coupled to a tuner. Examples of filters include a finite impulse response filter, a re-sampling RAM coefficient filter, and a cascade integrator comb filter among others. These filters can provide a variety of processing functions such as modulation, filtering, equalization, and scaling. The tuner generally includes a numerically controlled oscillator (NCO) and a quadrature amplitude mixer (QAM), and tunes the corresponding signals in channel 15 to an intermediate frequency. Hence, the NCO behaves as a local oscillator and the QAM translates the signal from baseband to the frequency of the NCO.

Combiner 16 combines signals $w_1'', w_2'', \ldots, w_N''$, typically through addition, and provides a composite signal W'' (i.e. $W''=w_1''+w_2''+\ldots+w_N''$) to output stage 17. However, signals $w_1'', w_2'', \ldots, w_N''$ can be combined using other mathematical functions to form W''. In some instances, the combining of signals $w_1'', w_2'', \ldots, w_N''$ can produce constructive interference and, consequently, increase the magnitude of signal W'' which can saturate amplifier 18. Saturation can occur, for example, when the amplitude of signal W'' is outside the dynamic range of amplifier 18.

Since it may be undesirable to increase the dynamic range of amplifier 18 because of cost considerations or manufacturing difficulties, regulator 14 predicts instances when signal W is outside the dynamic range of amplifier 18. The dynamic range can be defined as a threshold limit L, which is a signal magnitude in this discussion. However, L can be defined in terms of other properties of the signal, such as the amplitude, power, average power, signal-to-noise ratio, and peak-to-average power, among others.

Regulator 14 predicts instances when the composite signal W formed from signals $x_1, x_2, \ldots, x_N$ would produce a magnitude greater than L, where W' is an estimate of W. To limit W to W''', regulator 14 combines signals $\epsilon_1, \epsilon_2, \ldots, \epsilon_N$ with signals $x_1, x_2, \ldots, x_N$ so that the magnitude of W''' is less than or equal to L. In these instances, signal $x_N''$ will depend on $\epsilon_N$ (i.e. $x_N'' x_N(\epsilon_N)$). If the magnitude W' is already below L, then the input signals are uncorrected (i.e. $x_N''=x_N$).

There are several ways regulator 14 can limit signal W'''. For example, regulator 14 can determine the extent to which each signal $x_1, x_2, \ldots, x_N$ causes the magnitude of W' to be greater than L during a time interval. Regulator 14 can weight error vectors $\epsilon_1, \epsilon_2, \ldots, \epsilon_N$ so that the signal or signals in $x_1, x_2, \ldots, x_N$ that contribute to W' are modified and the others are unchanged or modified less. Hence, if $x_2$ contributes the most to W', then $x_2$ can be corrected than the other signals. Regulator 14 then combines error vectors $\epsilon_1, \epsilon_2, \ldots, \epsilon_N$ with corresponding signal $x_1, x_2, \ldots, x_N$ so that signal W''' is limited to L during that time interval. Hence, vectors $\epsilon_1, \epsilon_2, \ldots, \epsilon_N$ scale signals $x_1, x_2, \ldots, x_N$ to reduce signal W'. Signal $x_N$ scaled by $\epsilon_N$ when $\epsilon_N$ changes the magnitude and/or phase of $x_N$.

Figure 2:
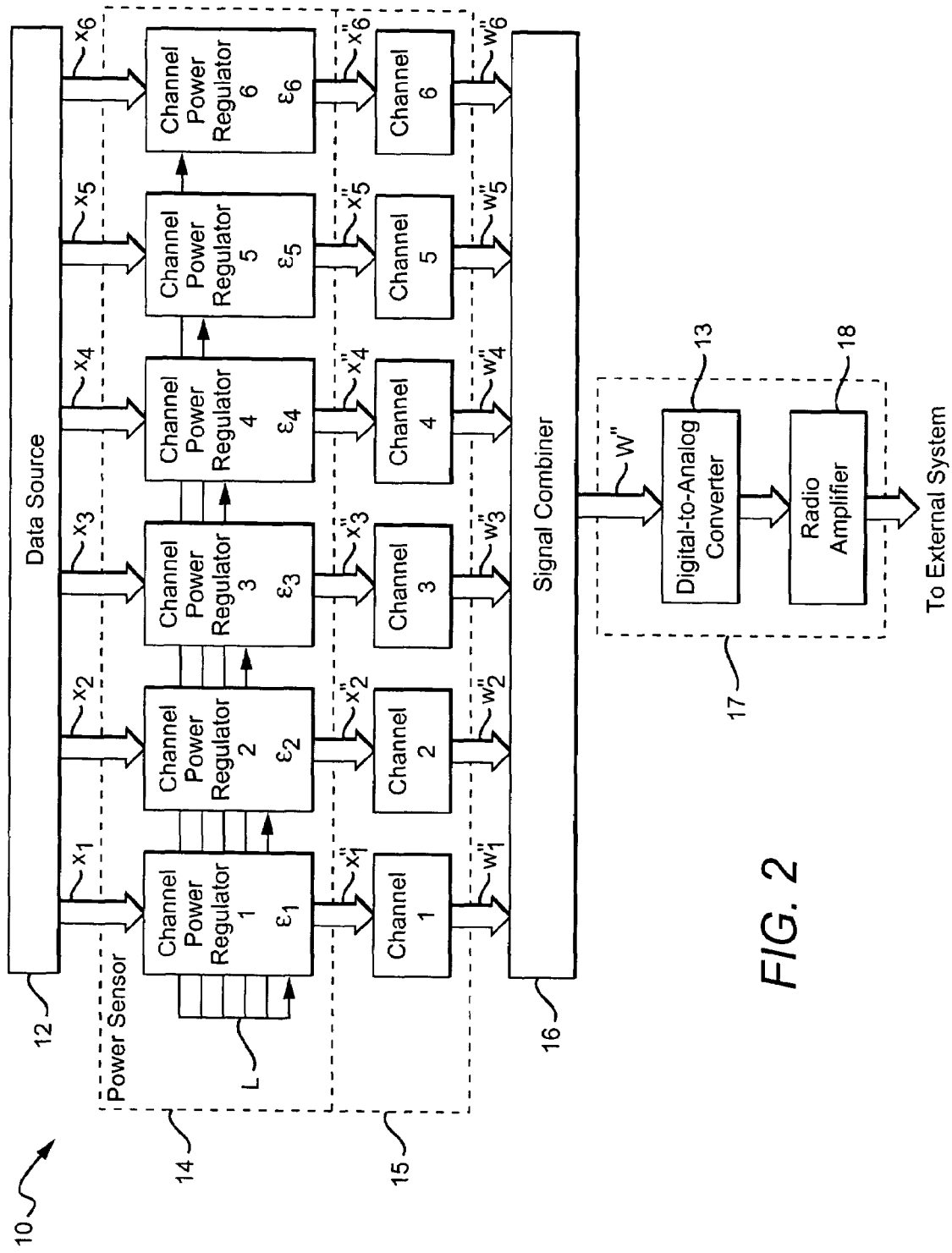
FIG. 2 is a more detailed block diagram of a multi-carrier communication system in accordance with the present invention.

FIG. 2 illustrates a more detailed block diagram of system 10 in accordance with the present invention. In this embodiment, data source 12 provides signals $x_1$ through $x_6$ to regulator 14. Regulator 14 includes power regulators 1 through 6 ("the power regulators") coupled to channels 1 through 6 ("the channels"), respectively. The power regulators provide signals $x_1''$ through $x_6''$ to channel 15, where channel 15 includes channels 1 through 6 (i.e. N=6) Threshold limit L is provided to each of the power regulators, either internally or externally from regulator 14.

The channels process and transmit signals $x_1''$ through $x_6''$ and provide signals $w_1''$ through $w_6''$ to combiner 16. In this embodiment, combiner 16 sums signals $w_1''$ through $w_6''$ to form signal W'''. Signal W''' is provided to radio amplifier 18 through a Digital-to-Analog converter 13, both of which are included in output stage 17. Amplifier 18 typically modulates W''' at an intermediate frequency and amplifies the modulated signal before it is communicated to an external system (not shown).

In operation, the power regulators each include circuitry to estimate the frequency response of the respective channels to provide a prediction of how Channels 1 through 6 would process signals $x_1$ through $x_6$ during transmission through channel 15. In this way, the power regulators can provide estimates $w_1'$ through $w_6'$ to form W'. The magnitude of W' can then be compared to L to determine if the uncompensated signal W''' needs to be reduced.

If signal W''' needs to be reduced, then regulator 14 determines which signal or signals in $x_1$ through $x_6$ need to be changed to decrease signal W''' to the desired level, L. Regulators 1 through 6 provide the appropriate correction which is applied to signal W' by combining signals $x_1$ through $x_6$ with respective error vectors $\epsilon_1$ through $\epsilon_6$. For example, the correction can be provided by adding $\epsilon_1$ through $\epsilon_6$ to signals $x_1$ through $x_6$ (i.e. $x_N''=x_N+\epsilon_N$) so that the magnitude of W''' is less than or equal to L. However, $\epsilon_1$ through $\epsilon_6$ can be combined with signals $x_1$ through $x_6$ using other mathematical functions such as subtraction, multiplication, division, or another function which can reduce the magnitude of W'''.

If regulator 14 predicts that the magnitude of W" will not exceed L, then signal W" does not need to be changed. In this case, signals $x_1$ through $x_6$ can be passed through the respective power regulators without correction, where they are outputted to channel 15 as signals $x_1$" through $x_6$" (i.e. $x_N$"=$x_N$).

Figure 3:
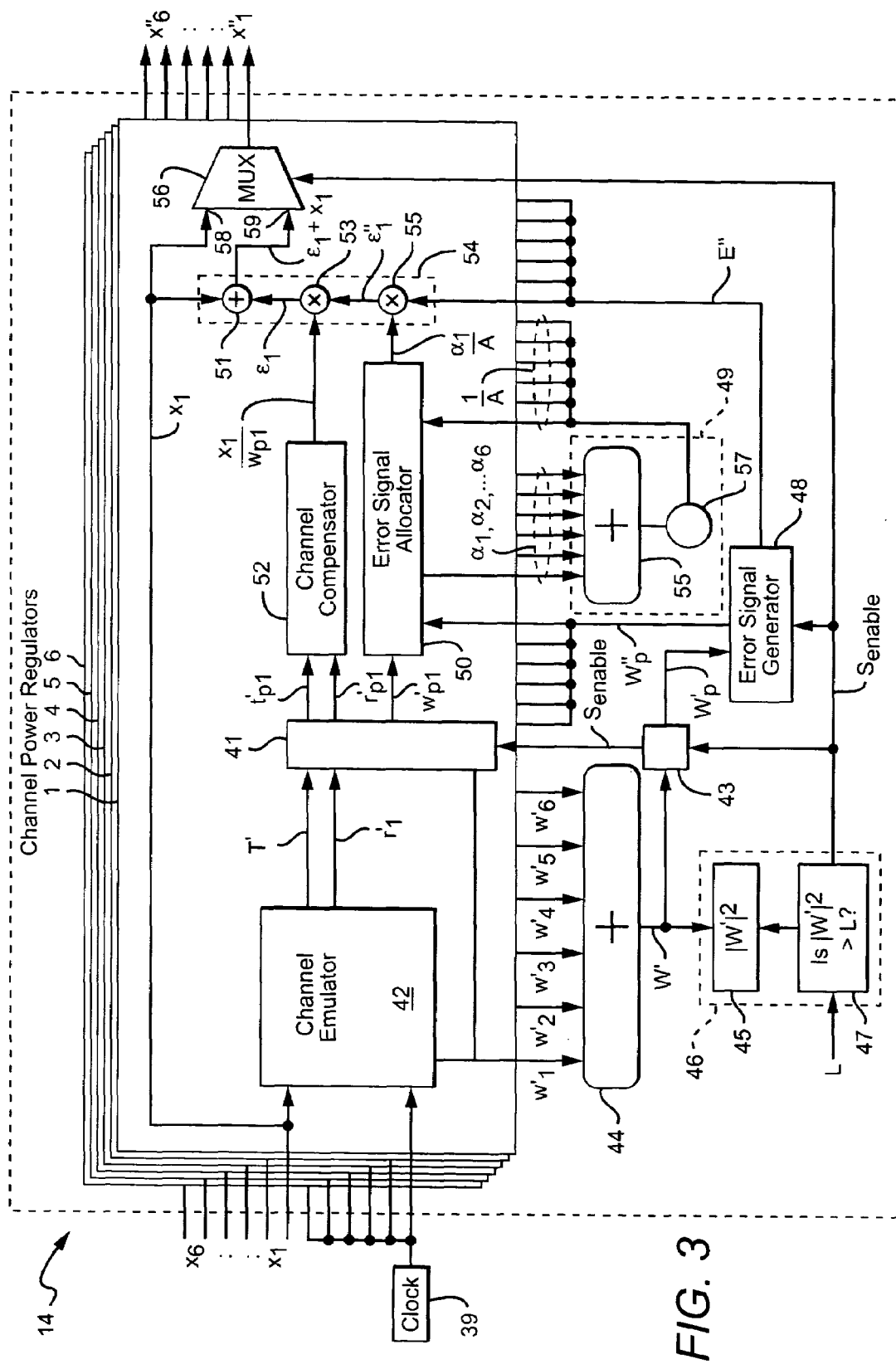
FIG. 3 is a simplified block diagram of a composite power regulator that can be used in the system of FIG. 2.

FIGS. 3 through 7 illustrate simplified block diagrams of one embodiment of composite power regulator 14 in accordance with the present invention, where regulator 14 includes channel power regulators 1 through 6. There is typically one power regulator per channel in multi-carrier channel 15. In FIG. 3, however, only power regulator 1 is illustrated in detail for simplicity and ease of discussion with power regulators 2 through 6 indicated in phantom. The discussion for power regulator 1 applies equally well to power regulators 2 through 6.

Figure 4:
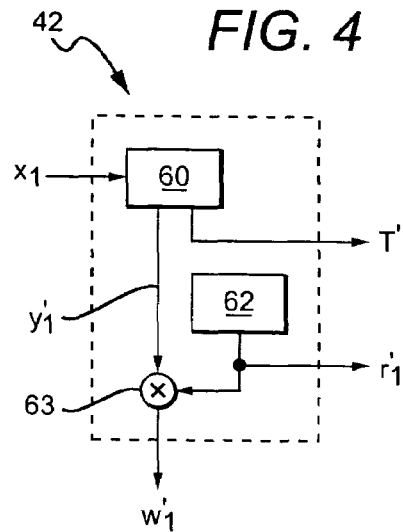
FIG. 4 is a simplified block diagram of a channel emulator that can be used in the system of FIG. 3.

Power regulator 1 includes a channel emulator 42, as illustrated in FIG. 4, which transmits and processes signal $x_1$ in a manner similar to Channel 1 so that a signal $w_1$' is an estimate of signal $w_1$". Emulator 42 includes an interpolating filter 60 coupled to an NCO emulator 62 through a signal combiner 63. Filter 60 can be a programmable filter which emulates the frequency response of Channel 1 and combiner 63 can be a multiplier. For example, filter 60 can be an interpolating filter which is programmed with coefficients that emulate the frequency response of the cascade of interpolating filters included in Channel 1.

In operation, filter 60 receives signal $x_1$, which is a digital signal in this embodiment, and outputs to combiner 63 a signal $y_1$', which is related to $x_1$ by the time response of filter 60. Emulator 62 provides a phase estimate of the NCO in Channel 1 which is combined with signal $y_1$' by combiner 63 to provide signal $w_1$'. The time response of filter 60 is convolved with the samples of signal $x_1$ over an input sample period, so the time response of filter 60 is chosen to select a desired number of samples of signal $x_1$. In general, as the time response of filter 60 increases, more samples of $x_1$ are selected during the convolution.

Emulator 42 also outputs T', $r_1$', and $w_1$', to a latch 41. Since signal $w_1$' (and signal $x_1$) generally varies as a function of time, the time phase and rotation phase information of $w_1$', denoted as T' and $r_1$', respectively, can be sampled over the input sample period of $x_1$ or another time period, and stored in latch 41. The sample period is determined by the frequency of a clock 39 and is typically divided into time intervals by the interpolation factor of filter 60. Hence, T' can be an array of instantaneous time values for signal $w_1$' and $r_1$' can be an array of instantaneous rotation phase values for signal $w_1$'. The instantaneous time values are determined by the interpolation factor from filter 60 and the phase of $w_1$' is determined relative to the phase of emulator 62.

Signal $w_1$' is outputted from emulator 42 to a signal combiner 44 along with signals $w_2$' through $w_6$' from regulators 2 through 6, respectively. Signal $w_1$' is also outputted to latch 41 where its value is stored at the largest value or values of signal W' in the sample period. Signal combiner 44 is chosen to provide the same combining function as combiner 16 (i.e. addition, for example). Hence, combiner 44 adds signals $w_1$' through $w_6$' and outputs composite signal estimate W' to a threshold detector 46 for each time value in T', where each W' is stored.

Detector 46 includes a multiplier 45 which provides the magnitude of each signal W', denoted as $|W'|^2$. Detector 46 stores $|W'|^2$ at each time interval in T' and a logic circuit 47 compares each $|W'|^2$ to L to determine if $|W'|^2$ exceeds L at any point in the sample period. If $|W'|^2$ exceeds L, then one or more of input signals $x_1$ through $x_6$ which form this particular W' can be combined with corresponding signals $\epsilon_1, \epsilon_2, \ldots, \epsilon_N$ to reduce $|W'|^2$ to L.

Detector 46 provides a signal $S_{enable}$ to latch 41, a latch 43, and a signal select 56. If $|W'|^2$ is less than L, then, in response to $S_{enable}$, signal select 56 outputs signals $x_1$ through $x_6$ unchanged through regulator 14. However, if $|W'|^2$ is greater than L, then regulator 14 determines which of signals $x_1$ through $x_6$ needs to be corrected to limit $|W'|^2$ to L. In this case and in response to $S_{enable}$, latch 43, outputs to error signal generator 48 the largest value of $|W'|^2$ stored in detector 46, which is denoted as $W_p$'. $S_{enable}$ also enables latch 41 to provide the particular time and phase, denoted as $t_{p1}$' and $r_{p1}$', respectively, of signal $x_1$ corresponding to $W_p$'. Time $t_{p1}$' and phase $rp_1$' are outputted by latch 41 to a channel compensator 52. Latch 41 also outputs to an error signal allocator 50 the value of signal $w_1$' at the time of $W_p$', which is denoted as $w_{p1}$'.

Figure 5:
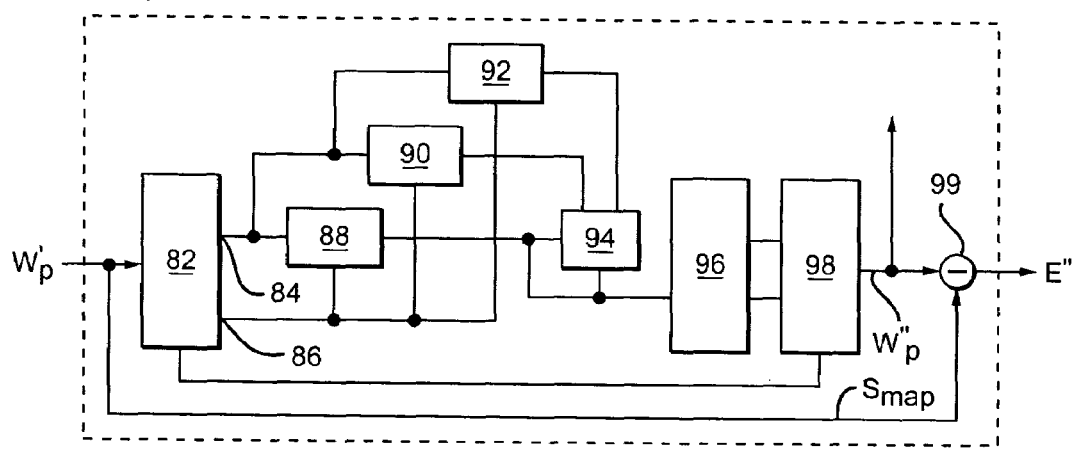
FIG. 5 is a simplified block diagram of an error signal generator that can be used in the system of FIG. 3.
Figure 6:
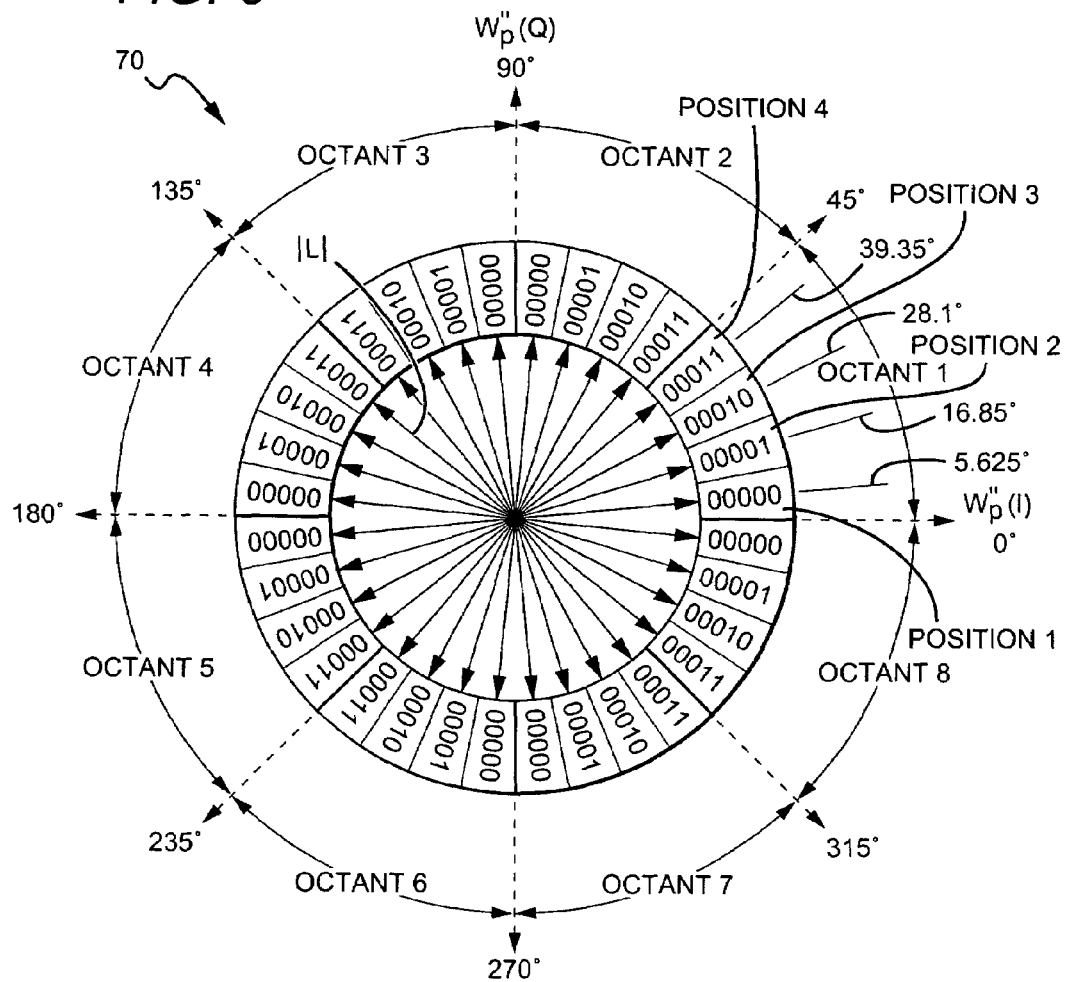
FIG. 6 is a vector diagram corresponding to the error signal generator of FIG. 5.

FIG. 5 illustrates one embodiment of error signal generator 48 and FIG. 6 illustrates a corresponding vector diagram 70. Diagram 70 represents a desired composite signal $W_p$" at different phases, where $W_p$" has a magnitude equal to L for each phase. Since $W_p$' has a magnitude greater than L as determined by sensor 46, generator 48 outputs $W_p$" which has the same phase as $W_p$' but with a magnitude equal to L. Hence, generator 48 chooses one of the vectors in diagram 70 with the phase closest to signal $W_p$'.

In this example, diagram 70 includes 32 possible phases for $W_p$", where each phase is separated from each adjacent phase by about 11.25° (360°/32=11.25°). However, diagram 70 can include fewer or more phases for signal $W_p$", where more phases generally provide greater accuracy.

In operation, signal $W_p$" is inputted into a mapper 82 which determines the in-phase, $W_p$'(I), and quadrature, $W_p$'(Q), components of $W_p$' to determine which octant in diagram 70 includes $W_p$'. For example, if $W_p$'(I) is negative and $W_p$'(Q) is positive, then signal $W_p$" is in one of Octants 3 and 4. If $W_p$'(I) is less than $W_p$'(Q), then signal $W_p$" is in Octant 3. However, if $W_p$'(I) is greater than $W_p$'(Q), then signal $W_p$" is in Octant 4.

Once the particular octant is determined by mapper 82, the phase of signal $W_p$" has been narrowed to four possible choices since there are four possible phases for signal W" in each octant. To determine the closest phase, mapper 82 maps the octant and signal $W_p$" to Octant 1 and stores the appropriate mapping information. The mapping information is used to provide a mapping signal $S_{map}$ to a mapper 98 as discussed below. $S_{map}$ can be one of eight 3-bit binary numbers from binary 000 to binary 111 which correspond to Octants 1 through 8, respectively. For example, Octant 6 can be represented by binary 110.

In Octant 1, each phase for $W_p$' can be distinguished by the angle of $W_p$' relative to 0°, where the vectors for signal $W_p$" are at Positions 0, 1, 2, and 3 which have phases at about 5.625°, 16.85°, 28.1°, and 39.35°, respectively. For example, as illustrated in FIG. 5, the phase for $W_p$" corresponding to binary 00000, 00001, 00010, and 00011 are at about 5.6° (Position 0), 16.85° (Position 1), 28.1° (Position 2), and 39.35° (Position 3), respectively.

Position selectors 88, 90, and 92 determine the desired position by determining which position includes signal $W_p$'. The position can be determined by comparing predetermined tangent values to the ratio of signals $W_p$'(Q) and $W_p$'(I), which is equal to the tangent of the phase of signal $W_p$'. Selector 88 compares the phase of $W_p$' to 22.5°. If the phase is less than 22.5°, then selector 90 compares it to 11.25°. If the phase is less than 11.25°, then the phase is in Position 0, but if the phase is larger than 11.25°, then it is in Position 1.

If the phase is larger than 22.5°, then phase selector 92 compares it to 33.75°. If the phase is less than 33.75°, then the phase is in Position 2, but if the phase is greater than 33.75°, then it is in Position 3.

Once the closest position is determined by selectors 88, 90, and 92, the value (i.e. binary 00000, 00001, 00010, or 00011) is outputted to look-up table 96. Look-up table 96 includes four values as shown in Table 1, where each value represents the possible real and imaginary components for signal $W_p''$ in Octant 1.

TABLE 1

The possible components of signal $W_p''$ included in look-up table 96.

| Position | Hexadecimal | Angular Equivalent |
|---|---|---|
| 0 | 00000 | 0.FF + i · 0.19 | cos(5.625°) + i · sin(5.625°) |
| 1 | 00001 | 0.F5 + i · 0.49 | cos(16.85°) + i · sin(16.85°) |
| 2 | 00010 | 0.E2 + i · 0.79 | cos(28.1°) + i · sin(28.1°) |
| 3 | 00011 | 0.C6 + i · 0.A2 | cos(39.35°) + i · sin(39.35°) |

In general, the phase whose tangent is $W_p'(Q)/W_p'(I)$ will not fall exactly on one of the four possible phases in an octant. Hence, signal select 94 outputs the position with the closest phase to look-up table 96 and then table 96 outputs the phase corresponding to that position. For example, if the phase of signal $W_p'$ is between 0° and 11.25°, then table 96 outputs hexadecimal 0.FF+i·0.19 (Position 0) to mapper 98, which becomes the components for $W_p''$. In other words the phase is defined to have a value of 5.625°, which is the closest phase to the phase of signal $W_p'$.

Once one of the four positions is chosen, mapper 98 unmaps the octant to the original position as indicated by $S_{map}$. Hence, signal $W_p''$ is outputted with the magnitude of L and the phase of signal $W_p'$. Signal $W_p''$ is then subtracted from $W_p'$ by a subtractor 99 to provide an error signal $E''$. Error signal $E''$ is used to determine how $x_1$ through $x_6$ are changed so that the magnitude of $W'$ is reduced to L.

Consider an example when signal $W_p'$ has a phase of 193° and a magnitude greater than L. In this case, mapper 82 will determine that $W_p''(I)$ is negative, $W_p''(Q)$ is negative, and $W_p'(I)$ is larger than $W_p''(Q)$. Consequently, the desired phase of signal $W_p''$ is in Octant 5. Hence, the desired phase has been narrowed to one of four positions. To determine which of the positions has the closest phase, mapper 82 maps Octant 5 to Octant 1 so that Octant 5 starts at 0° and $S_{map}$ equals binary 101.

Selectors 88, 90, and 92 then determine the phase whose tangent is $W_p'(Q)/W_p'(I)$ which, in this case is equal to 13° (193°−180°=13°). Hence, signal select 94 provides a value (binary 00001) to table 96 indicating that the phase is closest to Position 1. Consequently, table 96 outputs the value corresponding to Position 1 which is hexadecimal 0.F5+i·0.49. The hexadecimal number is outputted by table 96 to mapper 98. Mapper 98 then maps the signal back to the original location (i.e. Octant 5). Hence, error signal generator 80 has determined that signal $W_p''$ is closest to the signal with a phase equal to 196.85° (180°+16.85°=196.85°) which corresponds to binary 00001 in Octant 5.

Figure 7:
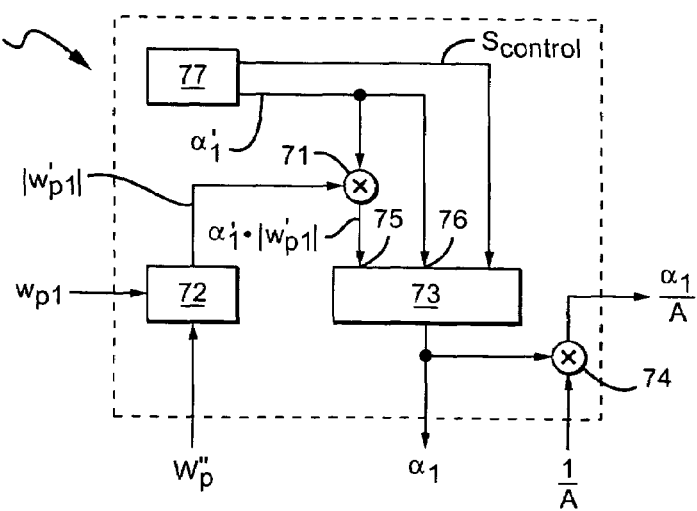
FIG. 7 is a simplified block diagram of an error signal allocator that can be used in the system of FIG. 3.

FIG. 7 illustrates one embodiment of error signal allocator 50. Allocator 50 includes a conjugate multiplier 72 which receives signal $W_p''$ from generator 48 and signal $w_{p1}'$ from latch 41. Signals $W_p''$ and $w_{p1}'$ are combined by multiplier 72 through conjugate multiplication to provide the magnitude of signal $w_{p1}'$ (i.e. $|w_{p1}'|$) to a signal combiner 71.

A memory element 77 is connected to a signal select 73 at an input 75 through signal combiner 71 and at an input 76. Element 77 provides an allocation factor $\alpha_1'$ and a control signal $S_{control}$ to control how signal $x_1$ is to be corrected. $S_{control}$ is provided to an enable of signal select 73 and determines whether or not signal $\alpha_1'$ or $\alpha_1' \cdot |w_{p1}|$ is outputted by signal select 73. For example, if signal $x_1$ is weighted compared to signals $x_2$ through $x_6$, then $\alpha_1'$ is provided from element 77 and combined with signal $|W_{p1}'|$ by combiner 71 to provide an allocation factor $\alpha_1$ (i.e. $\alpha_1 = \alpha_1' \cdot |w_{p1}'|$). If signals $x_1$ through $x_6$ are all weighted evenly, then element 77 provides the same allocation factor $\alpha_1'$ for all signal $x_1$ through $x_6$. Signal select 73 then outputs $\alpha_1'$ as $\alpha_1$ (i.e. $\alpha_1 = \alpha_1'$). Element 77 can be preprogrammed to output the desired weighting value or element 77 can be connected to external circuitry (not shown) to allow a user to choose the values for $\alpha_1'$ through $\alpha_6'$.

In FIG. 3, signal select 73 outputs $\alpha_1$ to a signal combiner 55 in a normalizer 49. An adder 55 adds allocation factors $\alpha_1$ through $\alpha_6$ to produce an allocation factor A (i.e. $A = \alpha_1 + \alpha_2 + \alpha_3 + \alpha_4 + \alpha_5 + \alpha_6$). Adder 55 outputs A to a divider 57 and divider 57 outputs 1/A to allocator 50. As shown in FIG. 7, factor 1/A is combined with $\alpha_1$ by a combiner 74 and the result, $\alpha_1/A$, is outputted to a signal combiner 54 (See FIG. 3).

Figure 8:
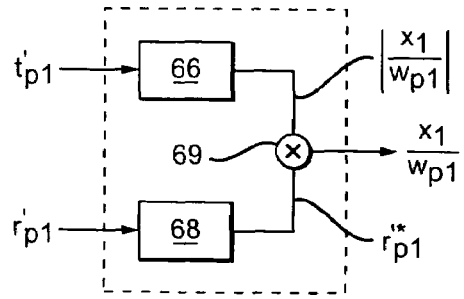
FIG. 8 is a simplified block diagram of an error signal compensator that can be used in the system of FIG. 3.

FIG. 8 illustrates one embodiment of channel compensator 52. Compensator 52 provides a signal that compensates the error signal so that it has the correct magnitude and phase after being transmitted through channel 15. Compensator 52 includes a signal selector 66 which receives $w_{p1}''$ and the time of $w_1''$, denoted as $t_{p1}''$. Compensator 52 also includes a conjugate multiplier 68 which receives the phase of signal $w_{p1}'$, denoted as $r_{p1}'$. Selector 66 outputs the magnitude of $x_1/w_{p1}$, denoted as $|x_1/w_{p1}|$, to a signal combiner 69 and multiplier 68 outputs $r_{p1}'^*$ to combiner 68 where they are multiplied together to provide a channel compensation signal $x_1/w_{p1}$ to signal combiner 54. Hence, if channel 15 rotates the phase of a signal by 1°, then compensator 52 will prerotate the signal by negative 1° so that the total phase rotation is 0° after traveling through channel 15.

In FIG. 3, a multiplier 55 in combiner 54 combines factor $\alpha_1/A$ with error signal $E''$ to provide an uncompensated error signal $\epsilon_1''$. A multiplier 53 combines signal $\epsilon_1''$ with $x_1/w_{p1}$ to provide a precompensated error signal $\epsilon_1$. Signal $\epsilon_1$ is combined with input signal $x_1$ by adder 51 to provide a signal equal to $\epsilon_1 + x_1$ to an input 59 of signal select 56. Signal $x_1$ is also provided to an input 58 of signal select 56.

Based on $S_{enable}$, signal select 56 chooses between signal $x_1$ and $x_1 + \epsilon_1$, one of which is outputted as signal $x_1''$ (i.e. $x_1'' = x_1$ or $x_1 + \epsilon_1$). Signal $x_1$ is outputted if the magnitude of W' is less than or equal to L, and signal $\epsilon_1 + x_1$ is outputted if the magnitude of W' is greater than L.

In some instances, signal W'' can have more than one portion in a sample period that exceeds L. Some portions can be subject to constructive interference from combining signals $x_1$ through $x_6$, as discussed above. In these instances, other portions can be subject to constructive interference from combining corrected signals $x_1''$ through $x_6''$ because, in general, $x_N'' = x_N + \epsilon_N$. Signals $\epsilon_N$ are out of phase with $X_N$ because $\epsilon_N$ is precompensated by channel compensator 52. Hence, in some instances error signals $\epsilon_N$ can be subject to constructive interference when combined together.

FIG. 9 illustrates a block diagram of another embodiment of composite power regulator 14 which can limit more than one portion of W'' to L. In this embodiment, regulator 14 includes three cascaded segments 100A, 100B, and 100C where segment 100A is connected to segment 100C through segment 100B. Each segment in regulator 14 includes the components illustrated in FIG. 3 and, consequently, the description of the components in FIG. 3 applies to each of segments 100A, 100B, and 100C. Further, the components included in segments 100A, 100B and 100C are denoted with a corresponding A, B, or C added to the element number.

One difference between segments 100A, 100B, and 100C is the number of taps in the filter included at the input of channel emulators 42A, 42B, and 42C. The number of taps determines the time response of a filter where, as the number of taps increases, the time response becomes wider. Hence, a multiple tap filter will have a wider time response than a single-tap filter. Since the time response of the filter is convolved with the sampled input signal over the sample period, a narrow time response filter can be used to selectively sample signal W'. By selectively sampling W', local maxima in signal W' can be more effectively ignored if the local maxima extends into an adjacent sample period. In these instances, it may be more accurate to compensate signal W' in the adjacent sample period instead of the current one. Once the largest magnitude portions of signal W' have been corrected, a filter with a wider time response can be used to more accurately select smaller magnitude portions of W' which are larger than L.

Hence, filter 60A includes a number of taps to provide a narrow time response to compensate W' more efficiently. Similarly, filter 60B includes more taps to provide a wider time response than filter 60A to compensate W' more accurately and filter 60C includes the most taps and the widest time response to compensate W' with the most accuracy. For example, filters 60A, 60B, and 60C can include a 1-tap, 5-tap, and 9-tap filter, respectively, where the number of taps is generally equal to the number of samples of signal W' that are selected.

In operation, signals $x_1, x_2, \ldots, x_6$ are provided to segment 100A which outputs signals $x_{1A}'', x_{2A}'', \ldots, x_{6A}''$ to segment 100B. Segment 100B outputs signals $x_{1B}'', x_{2B}'', \ldots, x_{6B}''$ to segment 100C which outputs signals $x_1'', x_2'', \ldots, x_6''$ to channel 15. In a sequence of sample periods, detectors 46A, 46B, and 46C determine sequentially the three largest magnitude portions of signal W'' and each correct one of these portions if they exceed L.

Hence, $x_N''=x_N$ if W'' does not exceed L in the sample period and $x_{NA}''=x_N+\epsilon_{NA}$ if a portion does exceed L. This portion corresponds to the largest magnitude portion of W''. If W'' exceeds L in only one portion, then $x_N''=x_{NA}''$. Otherwise, $x_{NB}''=x_{NA}''+\epsilon_{NB}$ if a second portion of W'' exceeds L. This corresponds to the second largest magnitude portion of W''. If $x_N''=x_{NB}''$, then only two portions of W'' exceed L. Otherwise, $x_N''=x_{NB}''+\epsilon_{NC}$ if a third portion of W'' exceeds L. While additional portions of W'' could also be limited to L, in most instances the probability of detecting a fourth or greater portion in the same sample period is small enough that it is not corrected for by regulator 14. Hence, segments 100A, 100B, and 100C limit more than one portion of W'' exceeding L.

FIG. 10 is a simplified flowchart illustrating a method 300 of static error allocation in accordance with the present invention. Method 300 includes a step 302 of providing a plurality of input signals to a power sensor. In a step 304, a composite signal is formed form the combination of the input signals and the magnitude of the composite signal is determined. In a step 306, the magnitude of the composite signal is compared to a threshold value. In a step 308, it is determined if the magnitude of the composite signal is greater than the threshold value. If the magnitude of the composite signal is not greater than the threshold value, then step 304 is repeated.

In a step 310, however, if the magnitude of the composite signal is greater than the threshold value, then an error signal is allocated in fixed proportions. In a step 312, the allocated error signal is precompensated for the channel gain and phase and combined with the corresponding input signal to decrease the magnitude of the composite signal to the threshold value. Hence, in static error allocation, the signal in each channel is decreased in fixed proportions to decrease the magnitude of the composite signal.

FIG. 11 is a simplified flowchart illustrating a method 326 of dynamic error allocation in accordance with the present invention. Method 326 includes a step 328 of providing a plurality of input signals to a power sensor. In a step 330, a composite signal is formed form the combination of the input signals and the magnitude of the composite signal is determined. In a step 332, the magnitude of the composite signal is compared to a threshold value. In a step 334, it is determined if the magnitude of the composite signal is greater than the threshold value. If the magnitude of the composite signal is not greater than the composite signal, then step 330 is repeated.

In a step 336, however, if the magnitude of the composite signal is greater than the threshold value, then an error signal is allocated according to the contribution of each signal to the composite signal. In a step 338, the allocated error signal is precompensated for the channel gain and phase and combined with the corresponding input signal to decrease the magnitude of the composite signal to the threshold value. The error signal can be adjusted as fast as once an input sample period in response to changes in the composite signal so that the magnitude of the composite signal is below the threshold value and step 330 is repeated. Hence, in dynamic error allocation, the input signal in each channel is adjusted by an amount proportional to contribution of the input signal to the composite signal. The magnitude of the composite signal and the error signal are adjusted as a function of time based on the instantaneous power of each channel to keep the magnitude of the composite signal below the threshold value.

Thus, a multi-carrier communication system has been disclosed where the communication system can correct for large amplitude peaks which can cause saturation or distortion in the various system components. The correction can be applied by providing an error signal which can be combined with the input signals so that a composite signal formed from the input signals can be corrected to a threshold value.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A communication system, comprising:
a plurality of channel power regulators, each sensing a corresponding input signal in a plurality of input signals and reducing said input signal in response to an indication that a composite signal formed from said plurality of input signals exceeds a threshold value;
further comprising:
a threshold detector which detects when said composite signal exceeds said threshold value; and
an error signal generator which responds to said composite signal exceeding said threshold value by generating an error signal, said power regulators applying said error signal to said input signals to limit said composite signal to said threshold value;
wherein:
said error signal generator generates a desired composite signal with a magnitude limited to said threshold value and in phase with said composite signal;
said plurality of channel power regulators are coupled to a multi-carrier communication channel; and
said plurality of channel power regulators provide an allocation factor, said allocation factor being applied to said error signal to provide an uncompensated error signal.

2. The system of claim 1, wherein said plurality of channel power regulators combine their corresponding input signals with said desired composite signal to provide respective weighting factors, said weighting factors being applied to said allocation factors.

3. The system of claim 1, wherein said plurality of channel power regulators process their corresponding input signals to provide a channel compensation signal that depends on the frequency response of a respective channel in said communication channel.

4. The system of claim 3, wherein said plurality of channel power regulators combine said channel compensation signal with said uncompensated error signal to form a precompensated error signal.

5. The system of claim 1, wherein said plurality of channel power regulators precompensates said uncompensated error signal by adjusting the magnitude and/or phase of said uncompensated error signal.

6. The system of claim 1, wherein said error signal generator includes:
   a circuit which generates an output signal which has a magnitude equal to said threshold value and a phase equal to that of an input signal; and
   a signal combiner which generates said error signal proportional to the difference between said input and output signals.

7. The system of claim 6, wherein said circuit includes a mapper which determines the in-phase and quadrature components of said input signal.

8. The system of claim 7, wherein said mapper determines an angle proportional to the tangent of said in-phase and quadrature components.

9. The system of claim 6, wherein said circuit includes a plurality of position selectors which determine the phase closest to the tangent of said in-phase and quadrature components.

10. The system of claim 9, further comprising a look-up table which includes phase values that are selected by said plurality of position selectors.

11. A communication system, comprising:
   a plurality of channel power regulators, each sensing a corresponding input signal in a plurality of input signals and reducing said input signal in response to an indication that a composite signal formed from said plurality of input signals exceeds a threshold value;
   further comprising:
   a threshold detector which detects when said composite signal exceeds said threshold value;
   an error signal generator which responds to said composite signal exceeding said threshold value by generating an error signal, said power regulators applying said error signal to said input signals to limit said composite signal to said threshold value; and
   at least one additional communication system cascaded with said communication system wherein said at least one additional communication system limits an aggregate signal formed from a plurality of corrected input signals in response to an indication that said aggregate signal formed from said plurality of corrected input signals exceeds said threshold value.

12. The system of claim 11, wherein the frequency response of each additional communication system is narrower than that of a previous communication system.

13. The system of claim 11, wherein the frequency response of each communication system is determined by the number of taps in a filter included in each channel power regulator.

14. The system of claim 11, wherein said plurality of channel power regulators provide an allocation factor, said allocation factor being applied to said error signal.

15. The system of claim 11, wherein said error signal generator generates a desired composite signal with a magnitude limited to said threshold value and in phase with said composite signal.

16. The system of claim 15, wherein said plurality of channel power regulators are coupled to a multi-carrier communication channel.

17. A transmit signal processor, comprising:
   a multi-channel signal regulation system that limits an aggregate signal in response to an indication that said aggregate signal exceeds a predetermined value, said aggregate signal being formed from a plurality of input signals;
   a multi-carrier communication channel coupled to said signal regulation system; and
   an output stage coupled to said multi-carrier communication channel;
   wherein said regulation system includes:
   an error signal generator which responds to said aggregate signal exceeding said threshold value by generating an error signal said power regulators applying said error signal to said input signals to limit said aggregate signal;
   a channel emulator which emulates the frequency response of a corresponding channel in said multi-carrier communication channel;
   an error signal allocator which provides an allocation factor, said allocation factor being applied to said error signal to provide an uncompensated error signal; and
   a channel compensator which provides a channel compensation signal that depends on the frequency response of said corresponding channel.

18. The processor of claim 17, wherein said plurality of input signals includes digital data encoded using one of code division multiple access and frequency division multiple access.

19. The processor of claim 17, wherein said output stage includes an amplifier, said predetermined value being determined by a dynamic range of said amplifier.

20. The processor of claim 17, wherein said regulation system includes a threshold detector which detects when said aggregate signal exceeds said threshold value.

21. The processor of claim of 20, wherein said threshold detector stores successive samples of said composite signal.

22. The processor of claim 17, wherein said regulation system includes a memory element which stores successive samples of a corresponding input signal.

23. The processor of claim 17, wherein said channel emulator provides a phase estimate of an oscillator included in said corresponding channel to said channel emulator, said phase estimate being included in said channel compensation signal.

24. The processor regulation system of claim 17, wherein said regulation system combines said channel compensation signal with said uncompensated error signal to form a precompensated error signal.

25. The processor of claim 24, wherein said regulation system outputs one of a corresponding input signal and said corresponding input signal combined with said precompensated error signal.

26. The processor of claim 17, further comprising at least one additional multi-channel signal regulation system cascaded with said communication system.

27. The processor of claim 26, wherein said at least one additional multi-channel signal regulation system limits an aggregate signal formed from a plurality of corrected input signals in response to an indication that said aggregate signal formed from said plurality of corrected input signals exceeds said threshold value.

* * * * *